Oct. 16, 1934.  M. O. CRAWFORD  1,977,174
FILTER
Filed Oct. 19, 1933

Witness:
H. de Boischevalier

Matthew O. Crawford
INVENTOR

Patented Oct. 16, 1934

1,977,174

UNITED STATES PATENT OFFICE 1,977,174

FILTER

Matthew O. Crawford, Detroit, Mich., assignor to Victor R. Heftler

Application October 19, 1933, Serial No. 694,252

5 Claims. (Cl. 210—169)

My invention relates to an improved form of filter element in which narrow filtering passages are provided by stacking washers punched out of thin material such as are described in the patent to V. R. Heftler No. 1,641,485, patented September 6, 1927.

Filter elements of this kind are formed of a stack of thin washers having holes pierced therethrough to form longitudinal channels substantially parallel to the axis of the stack, provided the thin washers aforesaid are held in registration. Some of the washers have a portion of the periphery removed so as to afford communication between the outside of the stack and the said longitudinal channels. The space left open by the removal of the said portion of the periphery is of a generally rectangular contour the length of which being equal to the length of the periphery removed and the width being equal to the thickness of the washer.

This improvement has for its object an improved construction of the means to maintain these washers in registration.

In the drawing, Figure 1 is a plan view of a filtering stack constructed according to my invention. Figure 2 is an elevation view thereof, partly in section.

Figure 3:
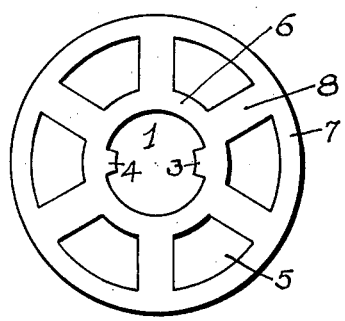
Figure 3 is a view of one washer of the first kind, and Figure 4 a view of a washer of the other kind.

The washers used in the making of my improved filtering element are preferably of two different kinds. They all have a central aperture 1, which is of generally circular contour but provided with lugs, 3 and 4, extending within the generally circular contour aforementioned. One series of washers, the one shown in Figure 3, has its periphery continuous and is also pierced with a plurality of holes, 5, intermediate the periphery and the central aperture. Thus, there is formed a washer having a hub portion 6, a rim portion 7 and arms 8.

Figure 4:
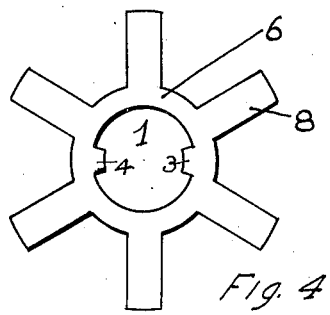

The washers of the other series are similar to the first ones, the only difference being that a portion of the periphery between arms 8 has been entirely removed, as clearly shown on the drawing. It will be plain that if a stack of washers is made, alternating washers of the first kind, that of Figure 3, with washers of the second kind, that of Figure 4, a cylindrical stack will be constructed, which stack will comprise a central aperture, a hub, a foraminous periphery and, between the hub and the periphery, a plurality of longitudinal passages parallel to the axis of the stack.

Figure 1:
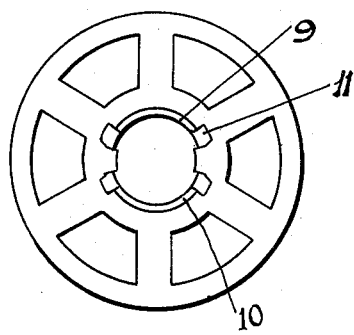
Figure 2:
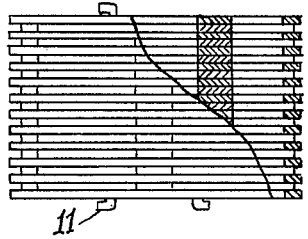
Figure 5:
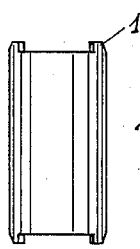
Figure 5 is a view of one of the arcuate pieces used in maintaining registration of the washers and Figure 6 is a plan view thereof, both figures being drawn before the final operation of assembly.
Figure 6:
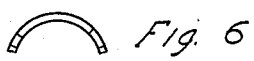

In order to maintain the successive alternation of washers in proper registration, I assemble the washers upon two arcuate pieces preferably stamped of thin metal and shown in elevation in Figure 5. These arcuate pieces are clearly shown at 9 and 10 in Figure 1 and Figure 2. The cross-section is such as to conform to the central aperture of the washers and to be confined therein by lugs 3 and 4. These arcuate pieces are provided at each end with lugs 11 which can readily be bent over as clearly shown on Figure 2, so as to maintain the washers in assembled relationship.

This construction eliminates the use of expensive central pieces and substitutes therefor stampings which can be cheaply and efficiently produced.

While I have shown in this drawing as a preferred form of embodying my invention, the alternation of washers in which alternate washers have an uninterrupted periphery and the intervening ones have a portion of the periphery cut away, I want it understood that I do not intend to be limited to this form and that my invention is applicable to other patterns of washers as are well known in the art. Such are the washers shown in the patent to V. R. Heftler, No. 1,694,939, issued December 11, 1928, and in which the filtering stack is also made of alternate washers in which are found apertures to form longitudinal passages and in which every washer has a portion of the periphery cut out, the difference between the two kinds of washers being in the location of those portions cut out with reference to the central aperture whose contour is such as to give each washer a definite position in its own plane.

Having thus described my invention I claim:

1. In a filtering stack composed of alternate laminary elements, a plurality of laminary elements having a central aperture provided with positioning lugs, a sheet metal member curved to conform to the contour of said aperture and adapted to engage said lugs.

2. In a filtering stack composed of alternate laminary elements, a plurality of laminary elements having a central aperture provided with positioning lugs, a sheet metal member curved to conform to the contour of said aperture and adapted to engage said lugs, said member having endwise projection adapted to be bent outwardly to maintain said elements in assembled relationship.

3. In a filtering stack composed of alternate laminary elements, a plurality of laminary elements having a central aperture provided with positioning lugs, a sheet metal member curved to conform to the contour of said aperture and adapted to engage said lugs, and means to maintain said member in position.

4. A filtering stack comprising a plurality of laminary elements having a non-circular central aperture, a sheet metal non-circular retaining member engaging said apertures and holding said laminary elements against angular displacement and means integral with said retaining member to hold said elements against axial dispersion.

5. A filtering stack comprising a plurality of laminary elements each having a plurality of non-circular apertures to form longitudinal passages when in registration, some of said apertures extending to the periphery to form laminary connections between one of said longitudinal passages and the peripheral surface of said stack and longitudinally disposed sheet metal means engaging registering apertures to hold said elements against angular rotation and means integral with said longitudinally disposed sheet metal means to hold said elements against axial displacement.

MATTHEW O. CRAWFORD.